United States Patent Office 3,667,931
Patented June 6, 1972

3,667,931
BISXANTHATE RICE HERBICIDES
Kenneth L. Viste, Warminster, and Marvin H. Fleischfresser, Warrington, Pa., assignors to Rohm and Haas Company, Philadelphia, Pa.
No Drawing. Filed Jan. 21, 1970, Ser. No. 4,742
Int. Cl. A01n 9/12
U.S. Cl. 71—102
9 Claims

ABSTRACT OF THE DISCLOSURE

Weeds in rice are controlled by applying a bisxanthate compound of the formula $$R-O-\underset{\underset{S}{\|}}{C}-S-R''-S-\underset{\underset{S}{\|}}{C}-O-R'$$

wherein R and R' are ethyl or n-propyl and R" is a divalent ($C_1$-$C_4$) alkylene radical. The bisxanthates and herbicidal compositions containing them are useful for the control of weeds in both direct seeded and transplanted rice.

---

This invention relates to compositions and methods for controlling the growth of weeds in rice.

Because rice is one of the world's most important cereal grain crops, there has been a continuing search for improved herbicides for controlling the growth of weeds in rice crops. A useful rice herbicide should kill the unwanted weeds without causing undue injury to the rice plants and should give lasting weed control at low dosages. Since all the known rice herbicides fall short of perfection, it would be desirable to have new rice herbicides which have improved features or which will complement the known rice herbicides in activity.

It has now been found that weeds in rice are controlled by applying a bisxanthate compound of the formula $$R-O-\underset{\underset{S}{\|}}{C}-S-R''-S-\underset{\underset{S}{\|}}{C}-O-R' \qquad (I)$$

wherein

R and R' are ethyl or n-propyl and
R" is a divalent alkylene radical having 1 to 4 carbon atoms, such as methylene, ethylene, propylene, or butylene.

Examples of the bisxanthate compounds which are useful as selective rice herbicides include bis(ethylxanthyl)methane, 1,2-bis(ethylxanthyl)ethane, 1,4-bis(ethylxanthyl)butane, bis(n-propylxanthyl)methane, and 1,2-bis(n-propylxanthyl)ethane. The preferred bisxanthates for use in rice crops are bis(ethylxanthyl)methane and bis(n-propylxanthyl)methane.

The bisxanthates of the invention are useful both in direct-seeded rice and in transplanted rice. When used in direct-seeded rice crops, the bisxanthates are applied postemergence as to both the rice and the weeds—that is, they are applied to the plants during early stages of growth while they are in a tender state and will selectively control the growth of the weed plants. When used in transplanted rice crops, the bisxanthates can be applied both preemergence and postemergence as to the weeds—that is, they can be applied to the transplanted rice plants and their growth medium either before the weed plants emerge or while the weed plants are in their early stages of growth. The bisxanthates can be applied to the growth medium either before or after the rice has been transplanted to that medium. When used in paddy rice crops, the bisxanthates can be either applied to the rice crop followed by flooding or applied directly on the flooded rice field.

The bisxanthates of the invention can be applied to the growth medium or to the rice crop in any amount which will give the required control of weeds. Generally, the rate of application is from about ½ to about 20 pounds of the bisxanthate per acre, and preferably from about 2 to about 8 pounds of the bisxanthate per acre.

A bisxanthate of the invention can be applied to the growth medium or to plants to be treated either by itself or, as is generally done, as a component in a herbicidal composition which also comprises an agronomically acceptable carrier. By agronomically acceptable carrier is meant any substance which can be used to dissolve, disperse, or diffuse a herbicidal compound in the composition without impairing the effectiveness of the herbicidal compound and which by itself has no detrimental effect on the soil, equipment, crops, or agronomic environment. Mixtures of the bisxanthates of the invention may also be used in any of the herbicidal formulations. The herbicidal compositions of the invention can be either solid or liquid formulations or solutions. For example, the bisxanthates can be formulated as wettable powders, emulsifiable concentrates, dusts, granular formulations, aerosols, or flowable emulsion concentrates. In such formulations, the compounds are extended with a liquid or solid carrier and, when desired, suitable surfactants are incorporated.

It is usually desirable, particularly in post-emergence applications, to include adjuvants, such as wetting agents, spreading agents, dispersing agents, stickers, adhesives, and the like, in accordance with agricultural practices. Examples of adjuvants which are commonly used in the art can be found in the John W. McCutcheon, Inc. publication "Detergents and Emulsifiers 1969 Annual."

The bisxanthate compounds of this invention can be dissolved in any appropriate solvent. Examples of solvents which are useful in the practice of this invention include alcohols, ketones, aromatic hydrocarbons, dimethylformamide, dioxane, dimethyl sulfoxide, and the like. Mixtures of these solvents can also be used. The concentration of the solution can vary from about 2% to about 98% with a preferred range being about 25% to about 75%.

For the preparation of emulsifiable concentrates, the compound can be dissolved in organic solvents, such as benzene, toluene, xylene, methylated naphthalene, corn oil, pine oil, o-dichlorobenzene, isophorone, cyclohexanone, methyl oleate, and the like, or in mixtures of these solvents, together with an emulsifying agent which permits dispersion in water. Suitable emulsifiers include, for example, the ethylene oxide derivatives of alkylphenols or long-chain alcohols, mercaptans, carboxylic acids, and reactive amines and partially esterified polyhydric alcohols. Solvent-soluble sulfates or sulfonates, such as the alkaline earth salts or amine salts of alkylbenzenesulfonates and the fatty alcohol sodium sulfates, having surface-active properties can be used as emulsifiers either alone or in conjunction with an ethylene oxide reaction product. Flowable emulsion concentrates are composed similarly to the emulsifiable concentrates and include, in addition to the above components, water and a stabilizing agent such as a water-soluble cellulose derivative or a water-soluble salt of a polyacrylic acid. The concentration of the active ingredient in emulsifiable concentrates is usually about 10% to about 50% and in flowable emulsion concentrates, this can be as high as about 75%.

Wettable powders suitable for spraying can be prepared by admixing the compound with a finely divided solid, such as clays, inorganic silicates and carbonates, and silicas and incorporating wetting agents, sticking agents, and/or dispersing agents in such mixtures. The concentration of active ingredients in such formulations is usually in the range of about 20% to 98%, preferably about 40% to 75%. A dispersing agent can constitute about 0.5% to about 3% of the composition, and a wetting agent can constitute from about 0.1% to about 5% of the composition.

Dusts can be prepared by mixing the bisxanthates of this invention with finely divided inert solids which may be organic or inorganic in nature. Materials useful for this purpose include, for example, botanical flours, silicas, silicates, carbonates and clays. One convenient method of preparing a dust is to dilute a wettable powder with a finely divided carrier. Dust concentrates containing about 20% to 80% of the active ingredient are commonly made and are subsequently diluted to about 1% to 10% use concentration.

Granular formulations can be prepared by impregnating a solid such as granular fuller's earth, vermiculite, ground corn cobs, seed hulls, including bran or other grain hulls, or similar material. A solution of one or more of the bisxanthates in a volatile organic solvent can be sprayed or mixed with the granular solid and the solvent then removed by evaporation. The granular material can have any suitable size, with a preferable size range of 16 to 60 mesh. The bisxanthate will usually comprise about 2 to 15% of the granular formulation.

The bisxanthates of the invention can also be mixed with fertilizers or fertilizing materials before their application. In one type of solid fertilizing composition in which the bisxanthates may be used, particles of a fertilizer of fertilizing ingredients, such as ammonium sulfate, ammonium nitrate, or ammonium phosphate, can be coated with one or more of the bisxanthates. The solid bisxanthates and solid fertilizing material can also be admixed in mixing or blending equipment, or they can be incorporated with fertilizers in granular formulations. Any relative proportion of bisxanthate and fertilizer can be used which is suitable for the crops and weeds to be treated. The bisxanthate will commonly be from about 5% to about 25% of the fertilizing composition. These compositions provide fertilizing materials which promote the rapid growth of desired plants, and at the same time control the growth of undesired plants.

The bisxanthates of the invention can be applied as herbicidal sprays by methods commonly employed, such as conventional high-gallonage hydraulic sprays, low gallonage sprays, airblast spray, aerial sprays and dusts. For low volume applications a solution of the compound is usually used. The dilution and rate of application will usually depend upon such factors as the type of equipment employed, the method of application, the area to be treated and the type and stage of development of the weeds.

For some applications, it may be desirable to add one or more other herbicides along with bisxanthates of the invention. For example, herbicides which are effective against broad-leaved weeds can be used to complement or improve the activity of the herbicidal composition against such weeds. Examples of other selective rice herbicides which can be incorporated to provide additional advantages and effectiveness include:

Carboxylic acids and derivatives 2,3,6-trichlorobenzoic acid and its salts
2,3,5,6-tetrachlorobenzoic acid and its salts
2-methoxy-3,5,6-trichlorobenzoic acid and its salts
2-methoxy-3,6-dichlorobenzoic acid and its salts
2-methyl-3,6-dichlorobenzoic acid and its salts
2,3-dichloro-6-methylbenzoic acid and its salts
2,4-dichlorophenoxyacetic acid and its salts and esters
2,4,5-trichlorophenoxyacetic acid and its salts and esters
2-methyl-4-chlorophenoxyacetic acid and its salts and esters
2-(2,4,5-trichlorophenoxy)propionic acid and its salts and esters
4-(2,4-dichlorophenoxy)butyric acid and its salts and esters
4-(2-methyl-4-chlorophenoxy)butyric acid and its salts and esters
2,3,6-trichlorophenylacetic acid and its salts
3,6-endoxohexahydrophthalic acid
dimethyl 2,3,5,6-tetrachloroterephthalate
trichloroacetic acid and its salts
2,2-dichloropropionic acid and its salts
2,3-dichloroisobutyric acid and Carbamic acid derivatives ethyl N,N-di(n-propyl)thiolcarbamate
propyl N,N-di(n-propyl)thiolcarbamate
ethyl N-ethyl-N-(n-butyl)thiolcarbamate
propyl N-ethyl-N-(n-butyl)thiolcarbamate
2-chloroallyl N,N-diethyldithiocarbamate
N-methyldithio-carbamic acid salts
S-ethyl hexahydro-1H-azepine-1-carbothioate
isopropyl N-phenylcarbamate
isopropyl N-(m-chlorophenyl)carbamate
4-chloro-2-butynyl N-(m-chlorophenyl)carbamate
methyl N-(3,4-dichlorophenyl)carbamate Phenols dinitro-o-(sec.-butyl)phenol and its salts
pentachlorophenol and its salts Diphenyl ether derivatives 2,4-dichloro-4'-nitrodiphenyl ether
2,4,6-trichloro-4'-nitrodiphenyl ether
2,4-dichloro-6-fluoro-4'-nitrodiphenyl ether
3-methyl-4'-nitrodiphenyl ether
3,5-dimethyl-4'-nitrodiphenyl ether
2,4'-dinitro-4-trifluoromethyldiphenyl ether Other organic herbicides N-(3,4-dichlorophenyl)propionamide When mixtures of herbicides are employed, the relative proportions which are used will depend upon the weeds to be treated and the degree of selectivity in weed control which is desired.

The bisxanthates of the invention are known compounds and are prepared by reacting a dihaloalkane, preferably a dibromoalkane, with a salt, preferably the potassium salt, of an alkylxanthic acid.

The following examples will further illustrate this invention but are not intended to limit it in any way.

EXAMPLE 1

Preparation of 1,2-bis(ethylxanthyl)ethane

This example illustrates the general preparative technique used in preparing the herbicides of the invention.

Potassium ethyl xanthate (64.0 g. or .4 mole) was added in portions to a solution of 1,2-dibromoethane (37.6 g. or .2 mole) in acetone (200 ml.) so that the temperature remained between 25° and 30°. At the end of the addition period the reaction reached 40°. After stirring for 3 hours, the contents of the flask were added to ice water, 800 ml., and cooled to 0° until precipitation commenced. The precipitate was collected and recrystallized from hexane. After two recrystallizations pure 1,2-bis(ethylxanthyl)ethane (15.5 g.) was obtained. This melted at 37–39° and was found to contain by analysis 35.2% C, 5.2% H, 12.4% O, and 47.5% S; $C_8H_{14}O_2S_4$ requires 35.5% C, 5.2% H, 11.9% O, and 47.5% S.

Following this method, the other bisxanthates of the invention can be prepared.

EXAMPLE 2

Evaluation of bisxanthates as selective rice herbicides

This example shows the selective postemergence herbicidal activity in rice (*Oryza sativa*) of bisxanthate compounds. The bisxanthates were used against the following weeds:

barnyard grass (*Echinocloa crusgalli*)
duck salad (*Heteranthera limosa*)
sprangletop (*Leptochloa imbricata*)
coffeeweed (*Sesbania marcrocarpa*)
umbrella sedge (*Cyperus difformis*)

The following bisxanthates were evaluated:

(A)
$$C_2H_5O\overset{S}{\overset{\|}{C}}SCH_2S\overset{S}{\overset{\|}{C}}OC_2H_5$$
bis(ethylxanthyl)methane (B)
$$C_3H_7O\overset{S}{\overset{\|}{C}}SCH_2S\overset{O}{\overset{\|}{C}}OC_3H_7$$
bis(n-propylxanthyl)methane (C)
$$C_2H_5O\overset{S}{\overset{\|}{C}}SC_2H_4S\overset{S}{\overset{\|}{C}}OC_2H_5$$
1,2-bis(ethylxanthyl) ethane (D)
$$C_2H_5O\overset{S}{\overset{\|}{C}}SC_4H_8S\overset{S}{\overset{\|}{C}}OC_2H_5$$
1,4-bis(ethylxanthyl) butane

Paddy test

Plants in three-inch deep pots which are 2 weeks old and 1 week old for postemergence applications were put into a 22-inch square metal pan which was then filled with water to 3 inches above the soil surface of the pots. A sufficient quantity of the test compound was dissolved in 100 ml. of 50% acetone to make an application rate of 4 pounds per acre and poured over the water surface. Observations were made two weeks after applications.

Table I summarizes the results of these tests.

TABLE I.—WEED CONTROL AND RICE INJURY IN PADDY TEST (PERCENT KILL)

| | 14 days old at treatment | | | | | 7 days old at treatment | | | |
|---|---|---|---|---|---|---|---|---|---|
| Bisxanthate | Rice | Barnyard grass | Duck salad | Sprangletop | Coffeeweed | Rice | Barnyard grass | Umbrella sedge | Coffeeweed |
| A | 10 | 90 | 96 | 100 | 90 | 64 | 100 | 89 | 90 |
| B | 0 | 95 | 90 | 90 | 100 | 40 | 90 | 85 | 90 |
| C | 10 | 30 | 40 | 90 | | 0 | 70 | 30 | |
| D | 0 | 30 | 30 | 50 | | 0 | 50 | 60 | |

The above tests and data indicate the selective postemergence herbicidal activity in rice of the bisxanthates of the invention.

Bisxanthates A, C, and D also resulted in 94, 80, and 80% kill, respectively, of barnyard grass when applied in pre-emergence applications to newly seeded plants. This data indicates the usefulness of the bisxanthates as herbicides when applied preemergence as to weeds in transplanted rice.

It is to be understood that changes and variations may be made without departing from the spirit and scope of the invention as defined by the appended claims.

We claim:

1. A method for controlling weeds in rice which comprises applying to the weeds during early stages of growth a compound of the formula $$R-O-\overset{S}{\overset{\|}{C}}-S-R''-S-\overset{S}{\overset{\|}{C}}-O-R'$$

wherein

R and R' are ethyl or propyl, and
R'' is a divalent alkylene radical having one to four carbon atoms, in an amount sufficient to control the growth of the weeds.

2. The method of claim 1 wherein the compound is applied at a rate of about ½ to about 20 pounds per acre.
3. The method of claim 1 wherein R and R' are ethyl and R'' is a methylene group (—CH₂—).
4. The method of claim 1 wherein R and R' are n-propyl and R'' is a methylene group (—CH₂—).
5. A method for controlling weeds in rice which comprises applying to the weeds during early stages of growth a herbicidal composition comprising an agronomically acceptable carrier and a compound of the formula $$R-O-\overset{S}{\overset{\|}{C}}-S-R''-S-\overset{S}{\overset{\|}{C}}-O-R'$$

wherein

R and R' are ethyl or propyl, and
R'' is a divalent alkylene radical having one to four carbon atoms, said composition being applied in an amount sufficient to control the growth of the weeds.

6. The method of claim 5 wherein R'' is a methylene group (—CH₂—).
7. A method of controlling weeds in transplanted rice which comprises applying to the growth medium prior to the emergence of the weeds from the growth medium a compound of the formula $$C_2H_5O-\overset{S}{\overset{\|}{C}}-S-R''-S-\overset{S}{\overset{\|}{C}}-OC_2H_5$$

wherein

R'' is a divalent alkylene radical having one to four carbon atoms, in an amount sufficient to control the growth of the weeds.

8. The method of claim 7 wherein the compound is applied at a rate of about ½ to about 20 pounds per acre.
9. The method of claim 7 wherein R'' is a methylene group (—CH₂—).

References Cited

UNITED STATES PATENTS 3,011,887  12/1961  Cupery et al. _____ 71—102 X
3,154,401  10/1964  Boogaart _____ 71—102

JAMES O. THOMAS, Jr., *Primary Examiner*